(12) United States Patent
Cheng et al.

(10) Patent No.: US 10,805,258 B2
(45) Date of Patent: Oct. 13, 2020

(54) MULTIPLE LINK LAYER ADDRESS RESOLUTION PROTOCOL (ARP)

(71) Applicant: International Business Machines Corporation, Armonk, NY (US)

(72) Inventors: Jian Mg Cheng, Shanghai (CN); Zhong Li, Pudong (CN); Wei Yg Guo, Shanghai (CN); Xian Dong Meng, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 16/202,894

(22) Filed: Nov. 28, 2018

(65) Prior Publication Data

US 2020/0169527 A1  May 28, 2020

(51) Int. Cl.
H04L 29/12 (2006.01)

(52) U.S. Cl.
CPC ........ H04L 61/103 (2013.01); H04L 61/6009 (2013.01); H04L 61/6022 (2013.01)

(58) Field of Classification Search
None
See application file for complete search history.

(56) References Cited

U.S. PATENT DOCUMENTS

| | | | |
|---|---|---|---|
| 8,300,647 B2 | 10/2012 | Abdulla | |
| 8,948,193 B2 | 2/2015 | Perlmutter | |
| 9,172,557 B2 | 10/2015 | Biswas | |
| 2006/0034190 A1* | 2/2006 | McGee | H04L 47/10 370/254 |
| 2010/0046537 A1 | 2/2010 | Perlmutter et al. | |
| 2015/0271101 A1* | 9/2015 | Arvidson | H04L 47/805 370/230.1 |
| 2015/0312137 A1* | 10/2015 | Li | H04L 12/6418 709/238 |
| 2015/0372917 A1* | 12/2015 | Biswas | H04L 45/64 370/392 |
| 2016/0036620 A1* | 2/2016 | Dunbar | H04L 12/4625 370/338 |
| 2016/0050145 A1 | 2/2016 | Tsirkin | |
| 2016/0315814 A1 | 10/2016 | Thirumurthi | |

FOREIGN PATENT DOCUMENTS

CN  101610283 A  12/2009

OTHER PUBLICATIONS

"Understanding Aggregated Ethernet Load Balancing", 2 pages, 2017, https://www.juniper.net/documentation/en_US/junos/concept/load-balance-technique-overview.html.
"Configuring a Load Balancing Based on MAC Addresses", 1 page, 2017, https://www.juniper.net/documentation/en_US/junos/topics/usage-guidelines/policy-configuring-load-balancing-based-on-mac-addresses-qfx-series.html.

* cited by examiner

*Primary Examiner* — Christine T Duong
(74) *Attorney, Agent, or Firm* — Fabian VanCott; Steven L. Nichols (57) ABSTRACT

A computer-implemented method comprising a processor providing a Multiple Address Resolution Protocol (MARP) message, wherein the MARP message comprises multiple Media Access Control (MAC) addresses associated with an Internet Protocol (IP) address.

20 Claims, 7 Drawing Sheets

| | Bit | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | Hardware address type |||||||||||||||||
| 1 | Protocol address type |||||||||||||||||
| 2 | Hardware address length |||||||| Protocol address length ||||||||
| 3 | Operation |||||||||||||||||
| 4 | Source hardware address count |||||||| Reserved ||||||||
| 5 | Target hardware address count |||||||| Reserved ||||||||
| 6 - 9 | Attribute Information |||||||||||||||||
| 10 - 11 | Source hardware address |||||||||||||||||
| 12 - 15 | Source protocol address |||||||||||||||||
| 16 - 17 | Target hardware address |||||||||||||||||
| 18 - 19 | Target protocol address |||||||||||||||||
| 20+ | Data |||||||||||||||||

MULTIPLE LINK LAYER ADDRESS RESOLUTION PROTOCOL (ARP)

BACKGROUND

The present invention relates to load balancing in a network. Specifically, the invention relates to an approach to allow originating devices to balance loads sent to multiple link layer addresses by a receiving device.

Address Resolution Protocol (ARP) is a communication protocol used to discover the link layer address (e.g., media access control address or MAC address) associated with an internet layer address. ARP is defined by Internet Standard STD 37 based on Request For Comment (RFC) 826 of the Network Working Group. ARP has since been implemented in a variety of network environments, including the widely used Institute of Electrical and Electronics Engineers (IEEE) 802 family which uses the Internet Protocol version 4 (IPv4) implementation. In Internet Protocol version 6 (IPv6), the ARP functionality is implemented using Neighbor Discovery Protocol (NDP).

SUMMARY

Among other examples, this specification describes a computer-implemented method which includes a processor providing a Multiple Address Resolution Protocol (MARP) message, wherein the MARP message contains multiple Media Access Control (MAC) addresses associated with an Internet Protocol (IP) address.

In an example, the MARP message is provided in response to receiving an Address Resolution Protocol (ARP) request. The method may the processor detecting a MARP indicator in the ARP request; and not providing an ARP response to the ARP request. This reduces the network load by avoiding an ARP response which is redundant to the MARP response. The processor may provide an ARP response to the ARP request wherein the MARP message has a higher priority than the ARP response.

In an example, the MARP message is a gratuitous MARP message. The MARP message may include a data payload. The MARP message may include a weighting for a MAC address among the multiple MAC addresses. The MARP message may provide a weighting for each MAC address. The MARP message may provide a weighting for all but one of the MAC addresses.

In an example, the processor providing the MARP message further includes consulting an ARP cache to identify MAC addresses sharing the IP address.

This specification also describes a computer-implemented method of balancing network loads. The method includes, by a processor, receiving a Multiple Address Resolution Protocol (MARP) message containing multiple Media Access Control (MAC) addresses associated with an Internet Protocol (IP) address. The method also includes allocating traffic between the multiple MAC addresses associated with the IP address.

The MARP message may be a gratuitous MARP message. The method may further include the processor sending an ARP request to the IP address. In some examples, the MARP message includes a weighting for a MAC address among the multiple MAC addresses and the processor allocates traffic between the multiple MAC addresses associated with the IP address based on the weighting.

This specification also describes a method of managing distribution of traffic in a network. This method includes a gateway receiving a MARP message from an IP address having multiple MAC addresses. The gateway receives a packet at the gateway for the IP address. The gateway changes the MAC address for the packet based on load between the multiple MAC addresses from packets previously sent by the gateway to the IP address. In this way, the gateway balances load to the multiple MAC addresses of the IP address without remote devices needing to have visibility to the multiple MAC addresses at the IP address.

The method may further include the gateway sending an ARP request to the IP address. In some examples, the load to different MAC addresses at the IP address is balanced based on information in the MARP message and the balancing is not all traffic to one MAC address and the balancing is not to split traffic evenly between the MAC addresses at the IP address. As discussed at length below, a variety of different load balancing approaches may be used, with control being located either in the gateway and/or in the IP address with the multiple MAC addresses. The MARP message may be used to update and dynamically balance the load to increase network performance. All this may be done without disrupting the existing ARP functionality.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, hut not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Providing load balancing on servers and similar devices provides a number of benefits to throughput. While balancing outgoing loads is relatively straightforward as the system knows the total load and the available transmission channels, balancing received load is more challenging as the total load is unknown and the distribution of the load provided by other sources is also unknown. Improved load balancing is an improvement to the function of a computer system and/or network.

Consider a host with three communication link layer addresses 1, 2, and 3. If all the incoming traffic is sent to address 1, then addresses 2 and 3 are underutilized while at the same time address 1 is overloaded and there will be delays in receiving and processing packets received at address 1.

One challenge is that the packet source(s) may not have visibility to all the addresses of the receiving host. If the packet source only knows of one link layer address, then all packets from that source will be directed to the known address. If this is widespread, it can produce the unbalanced loads on the different addresses, reducing performance. This may be partially mitigated by providing different addresses to different packet sources. However, this mitigation works is the different packet sources each provides a predictable number of packets. In practice, there is still likely to be differences in load on the different link layer addresses. And, in practice, these differences impact performance of systems communicating over networks.

Accordingly, one partial solution is to provide multiple or all address that may receive packets to the sending system. However, the current protocols (e.g., ARP) do not support identifying multiple link layer addresses at an interact protocol address.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention, in this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or early out combinations of special purpose hardware and computer instructions.

Among other examples, this specification describes a messaging protocol to identify multiple link layer addresses at an internet protocol address. In an example, a message according to the described protocol is provided in response to an ARP request. A message according to the describe protocol may be provided upon startup and/or under other conditions to inform packet sources and facilitate load balancing. Accordingly, the described material constitutes an improvement to the operation of the computing system itself. Specifically, it provides a way to balance loads by sending systems. It also provides a way for the receiving system to instruct sending systems to use multiple link layer addresses, including balancing loads between the link layer addresses and/or reserving a link layer address for specialize purposes.

As used in this specification and the associated claims a "gratuitous" message is one provided without having received an associated request. Gratuitous ARP and/or MARP messages may be provided, for example, at startup to update other entities to current link layer addresses. Gratuitous ARP (GARP) and/or Gratuitous MARP (GMARP) messages may include an indicator to indicate that the message is Gratuitous. In an example, gratuitous message includes the sender's protocol address (SPA) in the target protocol field (TPA=SPA), with the target hardware address (THA) set to zero. Another way to indicate a gratuitous message is to broadcast a reply with the sender's hardware and protocol addresses (SHA and SPA) duplicated in the target fields (TPA=SPA, THA=SHA). A gratuitous message may also include an indictor in the operations code field.

As used in this specification and the associated claims the term "MAC Address" may be used interchangeably with hardware address and/or link layer address. While there are differences between these terms, the described material may be implemented on each of these items without departing from the described scope.

Figure 1:
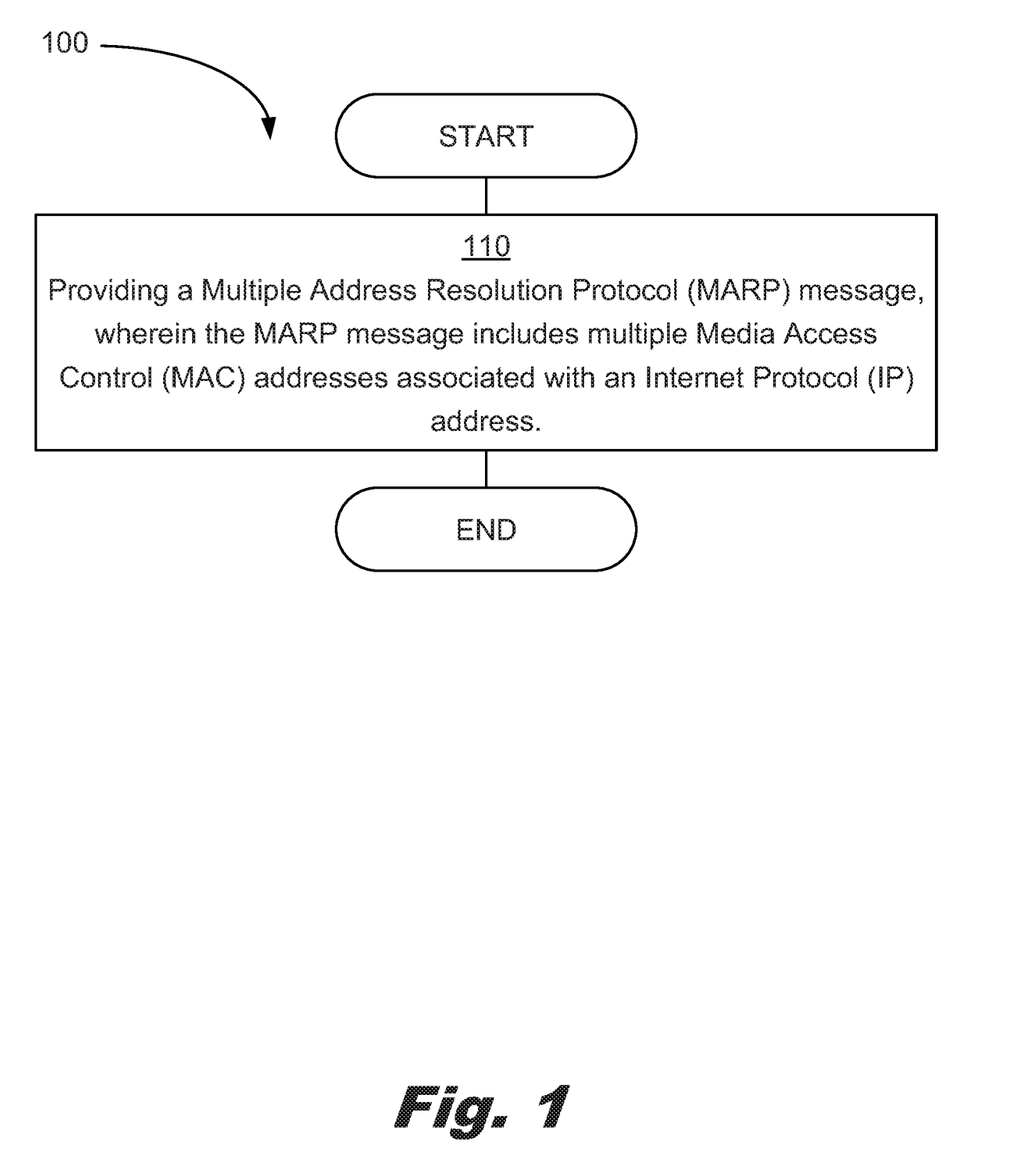
FIG. 1 shows a flow chart for a computer-implemented method consistent with the present specification.

Turning now to the figures, FIG. 1 shows a flow chart for a computer-implemented method (100) consistent with the present specification. The method (100) includes a processor providing (110) a Multiple Address Resolution Protocol (MARP) message, wherein the MARP message comprises multiple Media Access Control (MAC) addresses associated with an Internet Protocol (IP) address.

The method (100) includes the processor providing a MARP message. The MARP message may be provided in response to receiving an Address Resolution Protocol (ARP) request. The host may provide both an ARP response and the MARP message. The MARP message may be provided with a higher priority than the ARP response.

The ARP request may include a MARP indicator. The MARP indicator indicates that the requesting device is MARP compatible. Detecting the MARP indicator may inform the device receiving the ARP request to provide only a MARP response without an ARP response.

Currently a ARP request includes less than 40 bytes (octets) of data. The ARP request is often loaded with dummy data to fill the size of the packet to 40 bytes. In an example, the MARP indicator takes the place of part of this dummy data. It is desirable to have a MARP indicator and/or indicators which are unlikely to be accidently provided in the dummy data. In an example, the MARP indicator is a new MARP number.

The ARP request may use the Target hardware address (THA) field to indicate MARP compatibility. Currently, this field is ignored in an ARP request. Accordingly, it may be used to indicate that the originating device is MARP compatible. This, in turn, allows the responding device to provide a MARP message and not an ARP message to reduce network traffic. Of course, the responding system may provide both an ARP message and a MARP message instead. Similarly, the responding system may provide just an ARP message if the responding system is not MARP compatible. However, by embedding the MARP compatibility information in an unused field of the ARP request, compatibility with legacy systems is maintained.

In an example, the MARP message is a gratuitous MARP message. Gratuitous ARP and/or MARP message may be provided to update the caches in connected devices upon startup. For example, if a device receives a new MAC address(es) it may be useful to inform connected devices so that traffic is sent to the new, correct address. A gratuitous ARP and/or MARP message may be provided whenever one of the relevant MAC addresses is changed. Gratuitous messages may be provided for other reasons. For example, a host with multiple MAC addresses may change modes to reserve an address for a particular use. The host may provide a gratuitous MARP message to remove the reserved address from connected devices to avoid messages to the reserved addressed. Once the purpose of the reservation is complete, another gratuitous MARP message may be provided to make the reserved address available to connected devices again.

The MARP message may include a data payload in addition to the multiple MAC addresses. The data payload may include: additional routing and/or processing instructions for packets. In some examples, the data payload provides additional controls on which packets are sent to which MAC address. So a specific IP may be routed to a specific MAC address of the multiple MAC addresses and/or specific IPs may be excluded from specific MAC addresses. A variety of additional routing and/or control rules may be included in the data payload. The data payload may include weightings for traffic to be applied to the multiple MAC addresses. In an example, the weightings are equal. The weightings may be non-equal. The weighting may be based on capacity. In an example, the MARP message may contain weightings to reduce load on a currently overloaded link layer address. Once that overloaded link layer address is cleared and/or has a load similar to the other link layer addresses, a second MARP message may return the weighting to the previous, balanced configuration. The MARP message may be generated using information from an ARP cache.

The MARP message may be ARP compatible. That is, the MARP message may be processed as an ARP message by systems that do not include MARP capability. In an example, the MARP message provides an indicator at the end of the ARP message. In an example, the MARP message provides an indicator in a field of the ARP message, for example, in the Target hardware address of a message formatted as an ARP request.

Figure 2:
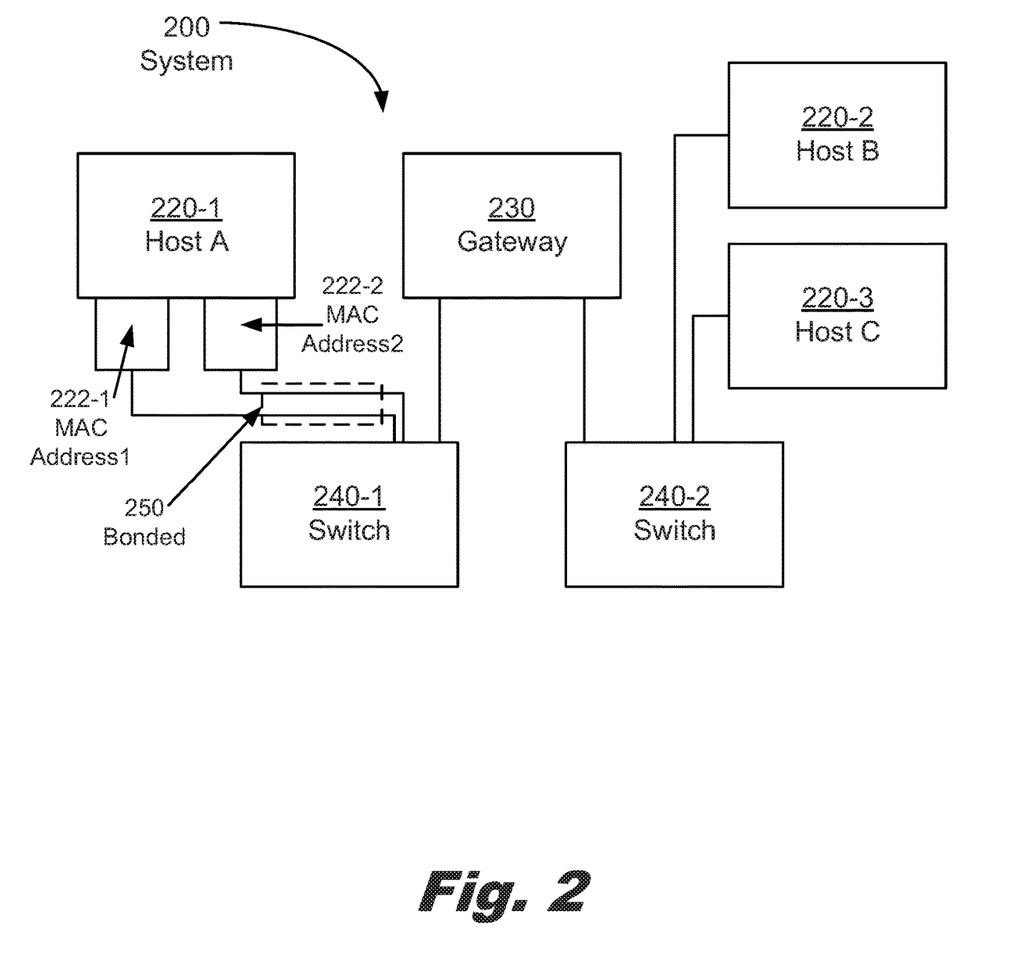
FIG. 2 shows an example of a system consistent with this specification.

FIG. 2 shows an example of a system (200) consistent with this specification. The system (200) includes Host A (220-1) which has two MAC addresses (222-1,-2) connecting Host A (220-1) with a first switch (240-1). A second switch (240-2) connects two other hosts, Host B (220-2) and Host C (220-3). A gateway (230) is connected to both switches (240-1 and 240-2) and provides a route for traffic to move between the Host A (220-1) and Host B and C (220-2,-3).

Under an ARP-based approach, if Gateway (230) sends an ARP request to Host A (220-1) via the first switch (240-1) the response will identify either MAC address 1 (222-1) or MAC address 2 (222-2). The ARP response will not identify the other MAC address not provided in the response. This same issue exists for Host B (220-2) and Host C (220-3) which are limited to accessing Host A through the gateway (230). Accordingly, the provided MAC address for Host B (220-2) and Host C (220-3) will all default to the same MAC address (222) of the two MAC addresses (222-1,2). As a result, there is no balancing of traffic between the two MAC addresses (222) of Host A (220-1). Because the two MAC addresses are bonded (250) as shown, Host A (220-1) may still distribute outbound traffic between the two address (222), even favoring the not-overloaded MAC address (222) over the MAC address (222) stored by the gateway (230) but this does not balance the incoming load.

Now consider the contrasting situation if Gateway (230) receives both MAC addresses (222-1,-2) from Host A (220-1) in response to an ARP request. Gateway (230) may now provide load balancing on the traffic passing through Gateway (230) to Host A (220-1). In contrast, using the Gateway (230) to provide the load balancing between Host B (220-2) and Host C (220-3) may be transparent to Host B (220-2) and Host C (220-3) while balancing the usage of both MAC addresses (222) of Host A (220-1).

While this demonstration describes two MAC addresses (222-1,-2) and two external Hosts (220-2,-3) the concept may be scaled to apply to much larger systems and more complex connections. This coordination of traffic if facilitated by the new ability of the Gateway (230) to access both MAC addresses (222) of Host A (220-1).

In more complex networks, Gateway (230) may be one source of traffic among several providing packets to Host A (220-1). Accordingly, the MARP messages may also be used to provide weightings to Gateway (230) and other traffic sources to regulate the distribution of traffic to the MAC addresses (222-1,-2) of Host A (220-1). For example, suppose under one condition, gateway (230) is instructed to allocate 0.5 (50%) of traffic to MAC address 1 and 0.5 (50%) of traffic to MAC address 2. Now suppose that another source of traffic start providing a large amount of traffic to MAC address 1 (222-1) perhaps another gateway (230) and/or Host (220) which lacks the MARP capabilities described in this specification. Host A (220-1) may recognize the unbalance of incoming traffic and send Gateway (230) new weightings to reduce the load on the overloaded MAC address (222). For example, Host A (220-1) may send a MARP message shifting the weightings from 50%-50% to 20%-80%. If the traffic from the other source stops, Host A (220-1) may provide another MARP message to the Gateway (230) to shift the weightings to another condition (or back to 50%-50. In this way, the presence of even a few nodes using the described MARP messaging and load balancing may stabilize a network and/or system (200) which still a majority of ARP-based devices. Further, because these balancing messages are relatively small and readily processed this load balancing does not contribute significant additional traffic. These weight balancing adjustment MART messages travel from Host A (220-1) to the Gateway (230) but improve load going from the Gateway (230) to Host A (220-1), Load balancing on the outgoing traffic from Host A (220-1) may be addressed internally by Host A which knows the loads Host A is attempted to send out.

Figure 3:
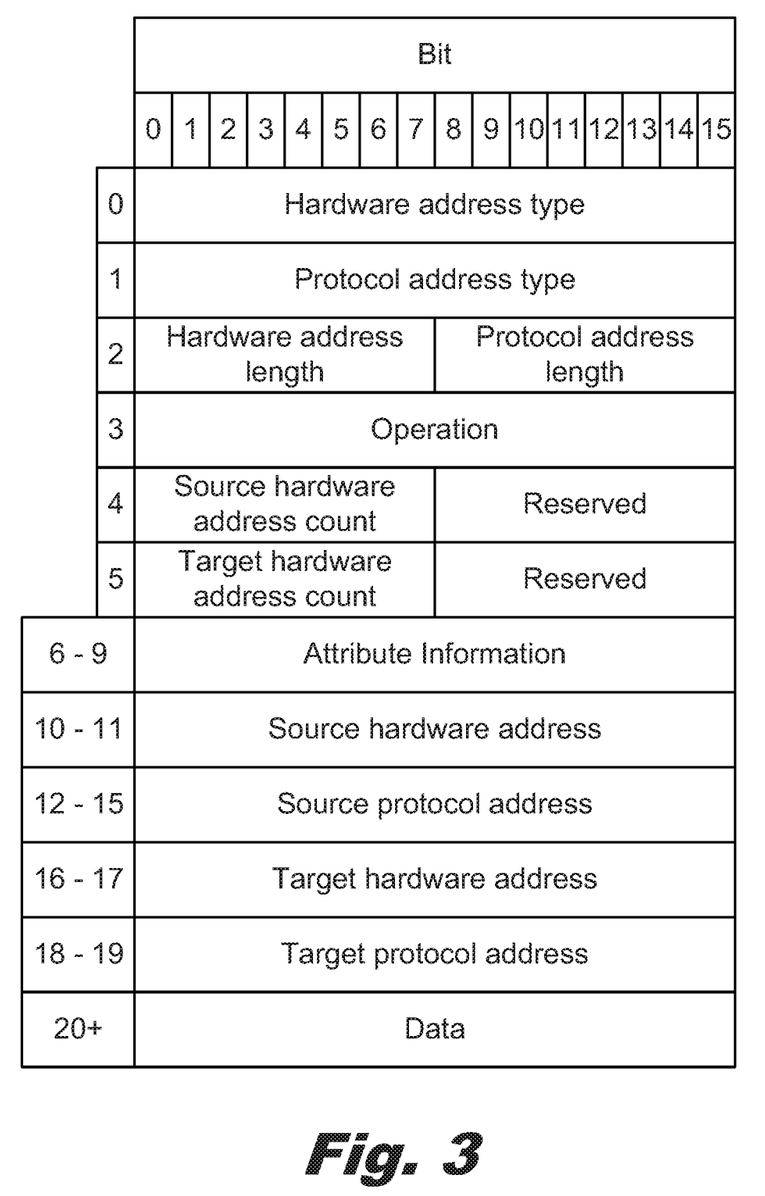
FIG. 3 shows an example of a data structure for a MARP message consistent with this specification.

FIG. 3 shows an example of a data structure for a MARP message consistent with this specification. Each field is presented below with the associated number of octets in parenthesis. While this example leans heavily on the ARP structure to facilitate implementation, other MARP message formats are also possible. Maintaining structural similarity with ARP message formats may facilitate compatibility.

Hardware address type (2); Protocol address type (2); Hardware address length (1); Protocol address length (1); Operation (2); Source hardware address count (1); Reserved (1); Target hardware address count (1); Reserved (1); Attribute information (8); Source hardware address (4); Source protocol address (8); Target hardware address (4); Target protocol address (4); and Data (as needed). In a variation, the Data section is not included.

Hardware type (HTYPE). This field specifies the network link protocol type. For example, Ethernet may be 1.

Protocol type (PTYPE). This field specifies the internetwork protocol for which the ARP request is intended. For example, in IPv4, this may have the value 0x0800. The permitted PTYPE values may share a numbering space with those for EtherType.

Hardware length (FILEN), Length (in octets) of a hardware address. For example, the size of Ethernet addresses is 6.

Protocol length (PLEA). Length (in octets) of addresses used in the upper layer protocol. (The upper layer protocol specified in PTYPE.) For example, IPv4 has an address size of 4.

Operation. Specifies the operation that the sender is performing: 1 for request, 2 for reply, MARP may add additional operations beyond those used for ARP. For example, 3 may be used to indicate an update of link layer addresses, 4 may be used to indicate a change to distributions, etc.

Sender hardware address (SHA). Media address of the sender. In an ARP request this field is used to indicate the address of the host sending the request. In an MARP reply this field is used to indicate the address of the host that the request was looking for.

Sender protocol address (SPA). Internetwork address of the sender.

Target hardware address (THA. Media address of the intended receiver. In an ARP request this field is ignored. In an MARP reply this field is used to indicate the address of the host that originated the ARP and/or MARP request.

Target protocol address (TPA). Internetwork address of the intended receiver.

Figure 4:
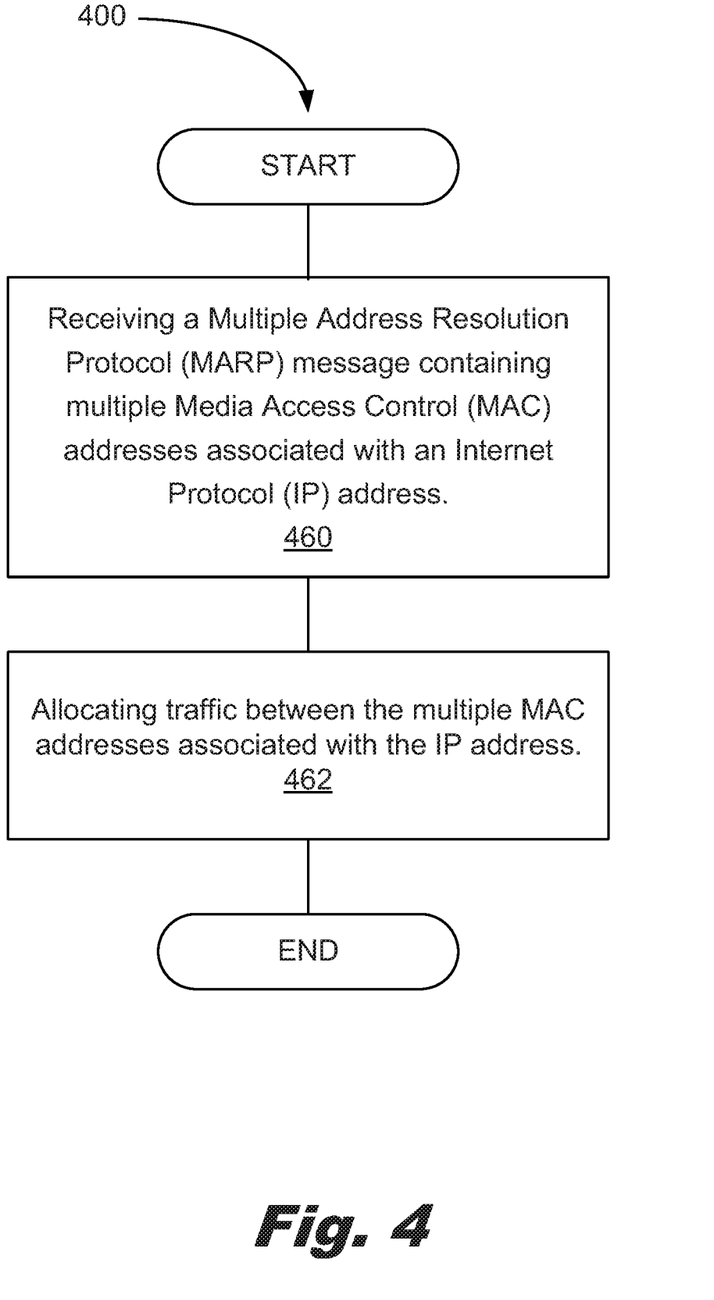
FIG. 4 shows a flow chart for a computer-implemented method of balancing network load consistent with this specification

FIG. 4 shows a flow chart for a computer-implemented method of balancing network load consistent with this specification. The method (400) includes: receiving (460) a Multiple Address Resolution Protocol (MARP) message containing multiple Media Access Control (MAC) addresses associated with an Internet Protocol (IP) address; and allocating (462) traffic between the multiple MAC addresses associated with the IP address.

The method (400) is a method of balancing network load. Specifically, it is a method (400) of balancing the load provided to different MAC addresses shared by an IP address. As discussed above, the providing balancing by a gateway (230) or similar intermediate between the source and the receiving host (220-1) provides a way to distribute the traffic from multiple hosts (220-2,-3) in a method which is transparent to the operations of the sending hosts (220-2,-3).

The method (400) includes receiving (460) a Multiple Address Resolution Protocol (MARP) message containing multiple Media Access Control (MAC) addresses (122) associated with an Internet Protocol (IP) address. As discussed above, in order to distribute packets and/or traffic to multiple MAC addresses (122), the unit needs to have the multiple MAC addresses (122) to provide the proper headers, etc.

The method (400) includes allocating (462) traffic between the multiple MAC addresses associated with the IP address. In an example, messages are allocated in a round robin fashion. Messages may be allocated according to size, so for example, a counter with a running total of the length of messages sent to the respective MAC addresses (122) divided by the weighting for their respective MAC addresses could be consulted with the next message being sent to the MAC address with the lowest total divided by weight. The counters may be reset when the weightings are updated. Other similar balancing approaches may also be used.

The MARP message may be a gratuitous AARP message. The method (400) may further include sending an ARP request to the IP address. The method (400) may further include sending a MARP request to the IP address.

The method (400) may include wherein the MARP message comprises a weighting for a MAC address among the multiple MAC addresses and wherein allocating traffic between the multiple MAC addresses associated with the IP address depends on the weighting. In other implementations, the allocation may be performed without weights using a default technique, such as the round robin allocation discussed above. So as to be clear, a round robin as used in this context indicates that each MAC address (122) is allocated an equal amount of traffic in turn. Equal may be defined by number of messages and/or by total size of messages. Each approach has associated characteristics which may recommend that approach for certain implementations.

Figure 5:
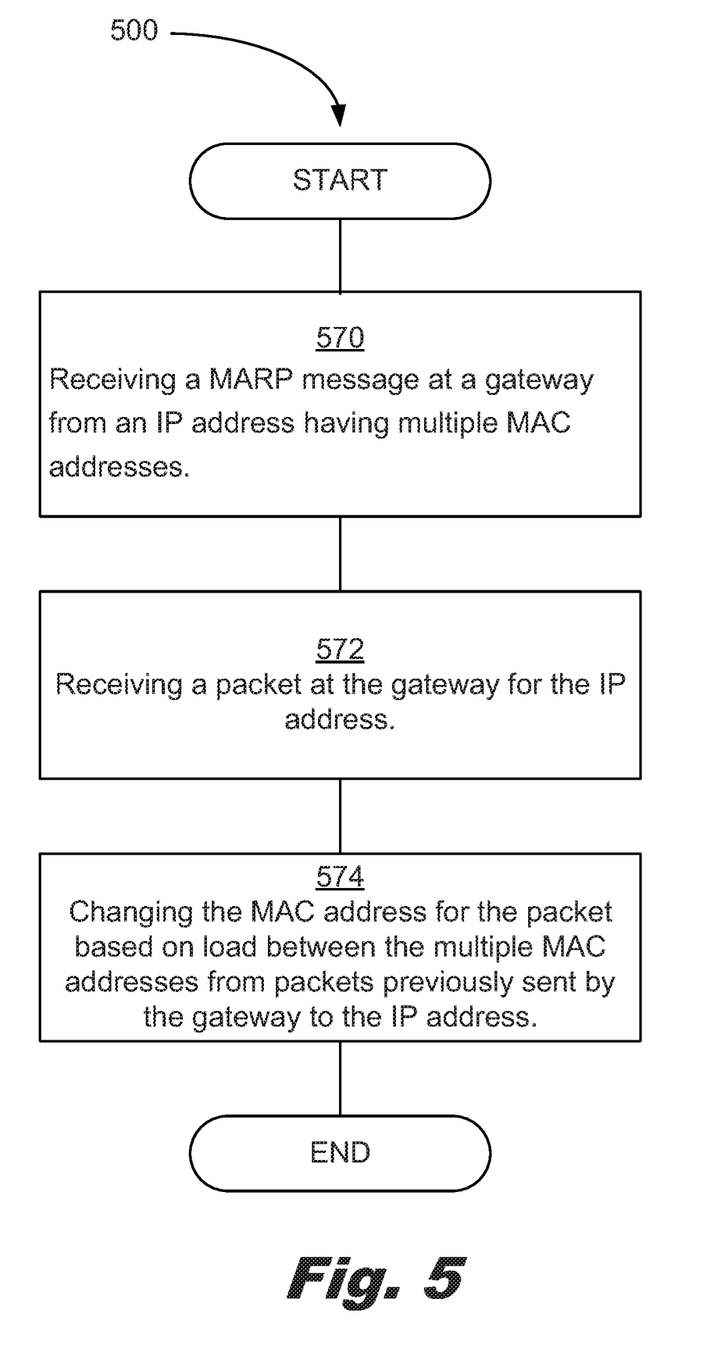
FIG. 5 shows a flow chart for a computer-implemented method of managing distribution of traffic consistent with this specification.

FIG. 5 shows a flow chart for a computer-implemented method (500) of managing distribution of traffic consistent with this specification. The method (500) includes, by a gateway receiving (570) a MARP message at a gateway (320) from an IP address having multiple MAC addresses; receiving (572) a packet at the gateway for the IP address; and changing (574) the MAC address for the packet based on load between the multiple MAC addresses from packets previously sent by the gateway (320) to the IP address.

The method (500) includes the gateway receiving (570) a MARP message at a gateway (320) from an IP address having multiple MAC addresses. The MARP message contains the multiple MAC addresses to receive traffic at the IP address. Knowing the MAC addresses allows the gateway (320) to allocate the traffic between the different MAC addresses (222) to avoid underutilizing any of the MAC addresses (222).

The method (500) includes receiving (572) a packet at a gateway (320) for the IP address. When the packet arrives, the packet is checked to see if the packet is intended for an IP address with multiple MAC addresses.

The method (1500) includes the gateway changing (574) the MAC address for the packet based on load between the multiple MAC addresses from packets previously sent by the gateway (320) to the IP address, if multiple MAC addresses (222) are available at the IP address and the packet is not currently allocated to the MAC address (222) intended to reduce overloading, then the packet is rerouted to another, less loaded, MAC address (222). Some packets will already have the selected MAC address (222) due to chance. In these cases, there is no need to adjust the MAC address (222) on the packet. In other cases, this chance of MAC address (222) provides the described load balancing helping increase performance of the network and the host (220) with multiple MAC addresses (222).

The method (500) may further include sending an ARP request to the IP address. In an example, the load to different MAC addresses at the IP address is balanced based on information in the MARP message and wherein the balancing is not all traffic to one MAC address and the balancing is not to split traffic evenly between the MAC addresses at the IP address. For example, balancing may be based on weights provided in the MARP message.

Figure 6:
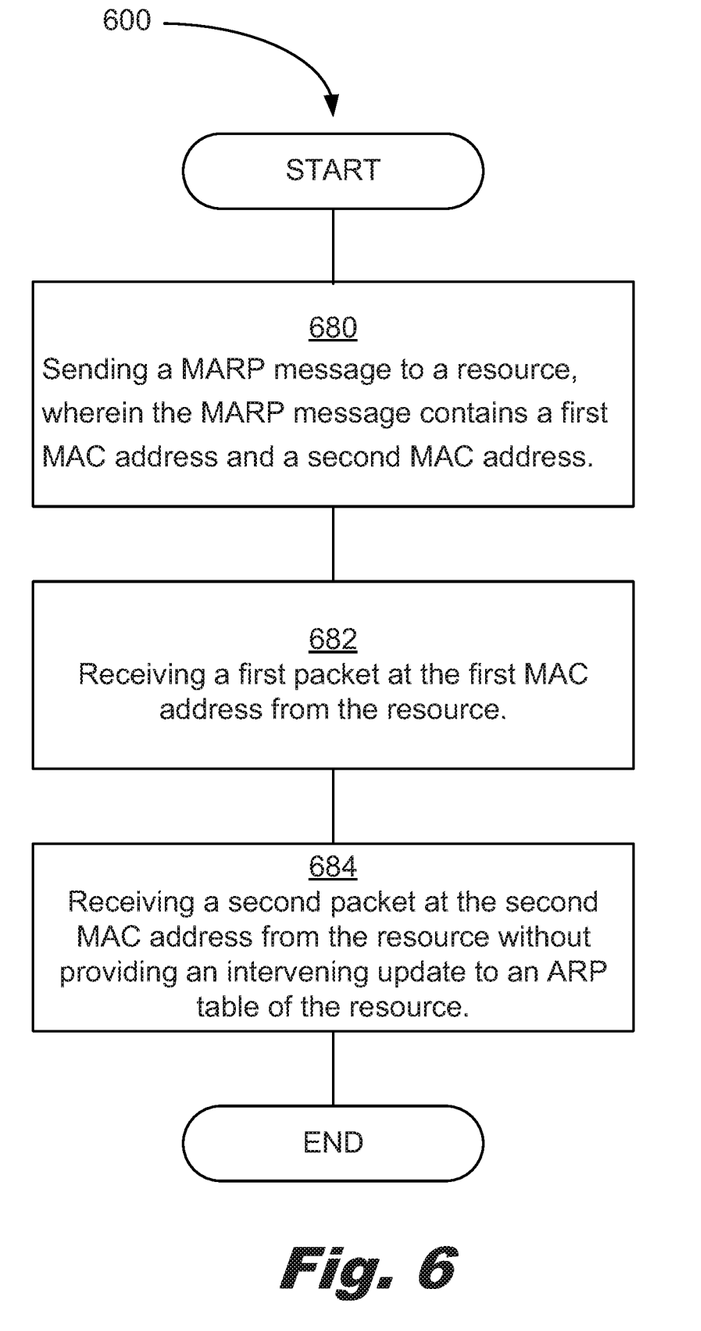
FIG. 6 shows a flow chart for a computer-implemented method of managing received packet load consistent with this specification.

FIG. 6 shows a flow chart for a computer-implemented method (600) of managing distribution of traffic consistent with this specification. The method (600) includes: sending (680) a MARP message to a resource, the MARP message containing a first MAC address (222-1) and a second MAC address (222-2); receiving (682) a first packet at the first MAC address (222-1) from the resource; and receiving. (684) a second packet at the second MAC address (222-1) from the resource without providing an intervening update to an ARP table of the resource.

The method (600) includes sending (680) a MARP message to a resource, the MARP message containing a first MAC address (222-1) and a second. MAC address (222-2). The MARP message is how the first MAC address (222-1) and second. MAC address (222-2) are provided to the resource. Providing multiple addresses in a single communication avoids the issue of overwriting the first address (222-1) with the second MAC address (222-2). It is desirable to be able to overwrite the MAC addresses (222) stored in the ARP table of the resource. For example, this is a common purpose of the gratuitous messages. However, it is also desirable to distinguish overwriting from providing an additional address (222) while preserving backwards compatibility. In another approach, a MARP message could include a new option of append to add a new MAC address (222) to the MARP table without overwriting the old MAC address (222) for the hardware address. This provides The method (600) includes receiving (682) a first packet at the first MAC address (222-1) from the resource. This operation is also performed by ARP-based implementations which have a single MAC address (222) stored in the ARP table for a network address. However, receiving a first packet proceeds being able to receive a second packet.

The method (600) includes receiving (684) a second packet at the second MAC address (222) from the resource without providing an intervening update to an ARP table of the resource.

To provide load sharing between multiple MAC addresses (222) using an ARP system, it is possible to provide periodic updates to the MAC address stored in the ARP table of the sending resource. For example, a system could detect when the difference in loads between a most loaded MAC address (222) and a least loaded MAC address (222) exceeds a threshold and provide a gratuitous ARP message updating the ARP table in the sending resource(s) to the least loaded MAC address (222). This approach may add substantial traffic to a network as the incoming packets are still coming to a single MAC address (222). Performing more complex load balancing by providing different MAC addresses (222) to different sources of packets is more challenging. Further that approach has issues with variation in packet rates from different sources.

In contrast, the described operation does not use an intervening message from the host (220) with multiple MAC addresses (222). Instead, any processing and/or control operations may be performed by the packet source and/or an intermediate node such as a gateway. Performing this operation at a gateway is particularly useful as this allows averaging of the packets over multiple packet sources without communication (and additional network load) between the packet sources. Accordingly, the tendency of the MAC address (222) queues to become unbalanced is reduced compared with the ARP implementation discussed above.

Figure 7:
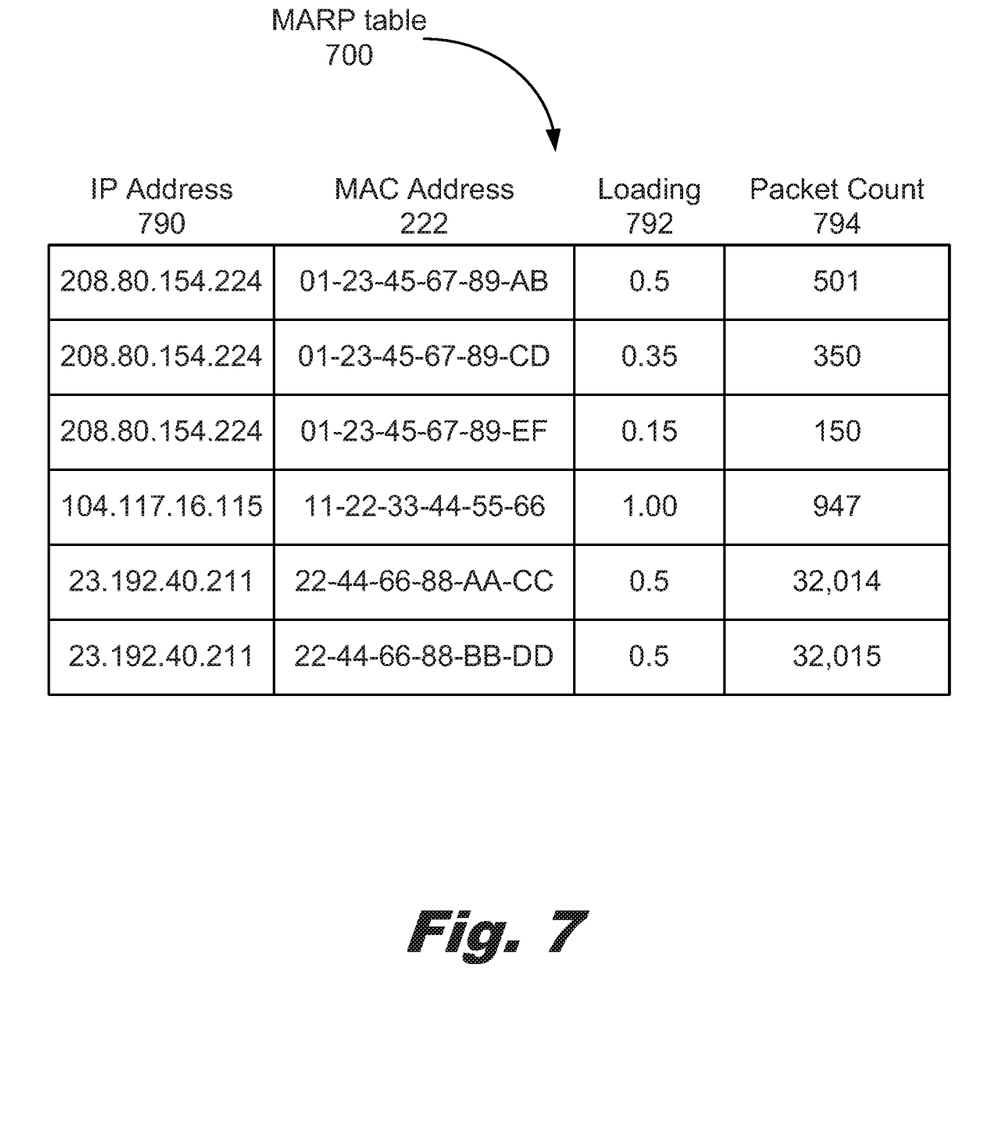
FIG. 7 shows a MARP table, a data structure, consistent with this specification.

FIG. 7 shows a MARP table (700), a data structure, consistent with this specification. The data structure is a MARP table (700). A MARP table (700) differs from an ARP table in that a MARP table (700) allows multiple MAC addresses (222) for a given IP address (790). In contrast, an ARP table supports a single MAC address (222) for a given IP address (790). Accordingly, processes interacting with an ARP table may need to be updated to accommodate a MARP table (700). Specifically, the process may not be able to stop parsing of the MARP table (700) upon discovery of the associated IP address (790). Instead, the process may, in some instances, continue through the MARP table (700) to identify all instances of the IP address (790) and their associated MAC addresses (222).

As shown in FIG. 7, the MARP table (700) may also include weightings (792) to control distribution between the multiple MAC addresses (222). The MARP table (700) may include registers (794) to track packet count and/or total packet size distribution between the multiple MAC addresses (222). The MARP table (700) may use position on the MARP table (700) to track which MAC address (222) received the last or is to receive the next packet. For example, the device may identify a first MAC address (222-1) in the MARP table (700) for the IP address (790) and send the packet to the first MAC address (222-1). The device may then update the MARP table (700) to move the first MAC address (222-1) to the end of the MARP table (700). In this manner the table position provides the ordering function without additional storage requirements for the packet counter (794) and/or weighting (792) values. As many ARP tables are stored in caches and similar limited and/or structured storage environments, this approach may be useful for providing backward compatibility.

In an example, distribution between different MAC addresses (222) is balanced by providing multiple instances of a MAC address (222) in the MARP table (700) as well as multiple MAC addresses (222) for an IP address (790). For example, if the device was requested to provide 25% of the packets to a first MAC address (222-1) and 75% of the packets to a second MAC address (222-2), the device could place one copy of the first MAC address (222-1) and three copies of the second MAC address (222-2) into the MARP table (700). The used MAC address could then be repositioned in the MARP table (700) after use to cycle through the MAC addresses (222) and produce the desired distribution of packets to the MAC addresses (222). While this approach is less storage and computationally efficient, this approach may be implemented in data storage designed to hold an ARP table without additional fields, providing backwards compatibility.

It will be appreciated that, within the principles described by this specification, a vast number of variations exist. It should also be appreciated that the examples described are only examples, and are not intended to limit the scope, applicability, or construction of the claims in any way.

What is claimed is:

1. A computer-implemented method comprising, with a processor;
   providing a Multiple Address Resolution Protocol (MARP) message, wherein the MARP message comprises multiple Media Access Control (MAC) addresses associated with an Internet Protocol (IP) address, wherein the MARP message comprises a weighting for a MAC address among the multiple MAC addresses, wherein the weighting controls distribution of packets among the multiple MAC addresses associated with the IP address;
   detecting a load imbalance among the multiple MAC addresses; and
   providing a gratuitous MARP message with a different weighting to balance loading of the multiple MAC addresses.

2. The method of claim 1, wherein the MARP message is provided in response to receiving an Address Resolution Protocol (ARP) request.

3. The method of claim 2, further comprising the processor detecting a MARP indicator in the ARP request; and not providing an ARP response to the ARP request.

4. The method of claim 1, where the MARP message is a gratuitous MARP message.

5. The method of 2, further comprising the processor providing an ARP response to the ARP request wherein the MARP message has a higher priority than the ARP response.

6. The method of claim 1, wherein the MARP message comprises a data payload.

7. The method of claim 1, wherein the processor providing a MARP message further comprises consulting an ARP cache to identify MAC addresses sharing the IP address.

8. A computer-implemented method of balancing network load comprising, by a processor:
   receiving a Multiple Address Resolution Protocol (MARP) message containing multiple Media Access Control (MAC) addresses associated with an Internet Protocol (IP) address, wherein the MARP message comprises a weighting for a MAC address among the multiple MAC addresses;
   allocating traffic between the multiple MAC addresses associated with the IP address and wherein allocating traffic between the multiple MAC addresses associated with the IP address depends on the weighting; and
   updating the weighting in response to receiving a second MARP message containing new weighting for the MAC address among the multiple MAC addresses, wherein the second MARP message is a gratuitous MARP message.

9. The method of claim 8, wherein the MARP message is a gratuitous MARP message.

10. The method of claim 8, further comprising the processor sending an ARP request to the IP address.

11. A method of managing distribution of traffic in a network, the method comprising, by a gateway:
    receiving a MARP message from an IP address having multiple MAC addresses wherein the MARP message includes multiple copies of a MAC address among the multiple MAC addresses;
    storing the multiple copies of the MAC address in an ARP cache;
    receiving a packet at the gateway for the IP address;

changing a MAC address for the packet based on load between the multiple MAC addresses from packets previously sent by the gateway to the IP address; and
reordering the MAC addresses associated with the IP address in the ARP cache.

12. The method of claim 11, further comprising sending an ARP request to the IP address.

13. The method of claim 11, wherein the load to different MAC addresses at the IP address is balanced based on information in the MARP message and wherein the balancing is not all traffic to one MAC address and the balancing is not to split traffic evenly between the MAC addresses at the IP address.

14. The method of claim 11, wherein multiple MAC addresses have multiple copies in the APR cache.

15. The method of claim 11, wherein reordering the MAC addresses is sequential.

16. The method of claim 8, wherein an ARP cache comprises counters for each of the plurality of MAC addresses associated with the IP address.

17. The method of claim 16, wherein receiving the second MARP message resets the counters.

18. The method of claim 8, wherein an ARP cache comprises multiple copies of a MAC address among the multiple MAC addresses associated with the IP address.

19. The method of claim 1, wherein the MARP message and gratuitous MARP message are provided to a switch.

20. The method of claim 1, wherein the gratuitous MARP message has a value in an operation field indicating a change to distributions between MAC addresses sharing an IP address.

* * * * *